(12) United States Patent
Ellett

(10) Patent No.: US 8,069,592 B2
(45) Date of Patent: Dec. 6, 2011

(54) HEAVY EQUIPMENT VEHICLE FOR LAYING PIPE

(76) Inventor: William Anthony Ellett, Houston, TX (US)

( * ) Notice: Subject to any disclaimer, the term of this patent is extended or adjusted under 35 U.S.C. 154(b) by 0 days.

(21) Appl. No.: 12/689,995

(22) Filed: Jan. 19, 2010

(65) Prior Publication Data

US 2010/0180475 A1      Jul. 22, 2010

Related U.S. Application Data

(60) Provisional application No. 61/145,830, filed on Jan. 20, 2009.

(51) Int. Cl.
*E02F 3/96* (2006.01)
(52) U.S. Cl. .......................................... 37/406; 414/719
(58) Field of Classification Search ............ 37/403–409, 37/468, 466; 414/731–738, 745.6, 680, 607, 414/672, 719; 254/134.3 R, 29 R; 294/115–119, 294/81.61, 81.4, 86.41, 88; 405/184.5, 154.1, 405/179, 174, 184.4
See application file for complete search history.

(56) References Cited

U.S. PATENT DOCUMENTS

| | | | | |
|---|---|---|---|---|
| 3,851,776 A * | 12/1974 | Leyrat | ............................ | 414/719 |
| 3,945,518 A * | 3/1976 | Inoue | ............................ | 414/719 |
| 4,130,204 A * | 12/1978 | Pickard | ....................... | 414/745.6 |
| 4,451,194 A * | 5/1984 | Keats et al. | .................... | 414/731 |
| 4,598,829 A * | 7/1986 | Young et al. | .................. | 212/280 |
| 4,693,384 A * | 9/1987 | Gilmore, Jr. | .................. | 212/257 |
| 5,918,923 A * | 7/1999 | Killion | ............................ | 294/88 |
| 5,954,471 A * | 9/1999 | Cullen | ............................ | 414/686 |
| 6,280,119 B1 * | 8/2001 | Ryan et al. | ..................... | 405/156 |
| 6,893,189 B2 * | 5/2005 | Matsushita et al. | ........... | 405/155 |

* cited by examiner

*Primary Examiner* — Robert Pezzuto
(74) *Attorney, Agent, or Firm* — Egbert Law Offices PLLC

(57) ABSTRACT

The present invention is a heavy equipment vehicle for laying pipe, such as a modified excavator. The vehicle includes an undercarriage with a tracks for moving, an excavator cab mounted to the undercarriage by a rotating platform, a counterweight mounted to the cab, a boom having a first arm and a second arm, two pipe hoists, and an excavator tool attachment. The excavator tool attachment can be a bucket, scoop, grapple, a pulverizer, claw or a hammer of an excavator. Each arm of the vehicle has a pipe hoist attached to an underside thereof. The pipe hoist element is a two-block hoist with a top block and a bottom block with a hook extending downward, and a winch with line connecting to the two-block hoist, such that the line lowers and raises a hook connected to a harness of a pipe. The boom can also have stabilizer attachments.

18 Claims, 5 Drawing Sheets

HEAVY EQUIPMENT VEHICLE FOR LAYING PIPE

RELATED U.S. APPLICATIONS

The present application claims priority under U.S. Code Section 119(e) from a provisional patent application, U.S. Patent Application No. 61/145,830, filed on 20 Jan. 2009 and entitled "H-BOOM PIPE LAYER".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to handling pipes. More particularly, the present invention relates to using heavy equipment, such as a modified excavator, to handle pipe. More particularly, the present invention relates to apparatus for maneuvering pipe in any direction.

2. Description of Related Art Including Information Disclosed Under 37 CFR 1.97 and 37 CFR 1.98

Pipe is installed underground so as to transport fluids, such as water or sewage. To install the pipe, an excavator must remove earth from a desired location so as to form a ditch for the pipe. The pipe is placed in the ditch, connected to a pipeline, and covered with earth so that the pipe resides underground. There is no simple way for installing long lengths of pipe. Thus, pipe sections are typically maneuvered from above ground to below ground so that the ends of pipe sections can be connected underground so as to form an underground pipeline.

A problem associated with the installation of underground pipe is that the pipe must be maneuvered so that its longitudinal axis corresponds with the longitudinal axis of the pipeline. Pipe-laying equipment must be repositioned so as to align the longitudinal axes of the pipe section and the pipeline every time a pipe section is delivered to the underground pipeline. Thus, there is a need for a pipe layer that can maneuver a pipe section in any direction without having to maneuver the entire system of pipe-laying equipment.

Another problem associated with delivering pipe for installation underground is that the pipe can swing back-and-forth as a result of the motion of the pipe-laying equipment that delivers the pipe section from above ground to below ground. Thus, there is a need for a pipe layer that can hold pipe in a horizontal position while steadily lowering the pipe from above ground to below ground for installation onto a pipeline.

An excavator is a form of heavy equipment for digging large amounts of land. The basic parts of an excavator include a cab or house on a rotating platform, an undercarriage, a boom, and an attachment. The attachment is a tool used in the digging action, such as a bucket, scoop, grapple, a pulverizer, claw or a hammer. The boom can consist of two arms, being pivotally attached to each other, with one arm pivotally attached to the cab. The undercarriage has tracks or wheels for allowing the excavator to move. The movement and functions of the excavator parts are accomplished through the use of hydraulic fluid, such as actuating the grapple or lowering the boom. The excavator is not typically used for laying pipe because the assortment of tools cannot perform the function of gripping pipes without damage.

Various patents have issued relating to pipe layers. U.S. Pat. No. 5,232,502, issued on Aug. 3, 1993 to Recker, discloses a pipe handling apparatus that has a first support beam having a first and a second end portion, an engaging arm having a first and a second end portion that are sufficient for positioning within a length of pipe, a second support beam connected to the respective first end portion of the first support beam and the first end portion of the engaging arm so as to secure the first support beam and the engaging arm together in spaced parallel relation from one another, a mechanism for supporting the length of pipe on the engaging arm where the mechanism is positioned relative to the engaging arm at spaced locations on the first and second end portions thereof, and a mechanism for providing a spray of fluid when the mechanism is secured to the second end portion of the engaging arm. An operator directs the apparatus from above ground to below ground. The apparatus can be used in combination with an excavator.

U.S. Pat. No. 5,918,923, issued non Jul. 6, 1999 to Killion, discloses a pipe-laying attachment for a hydraulically-powered device. The attachment has an elongate horizontal frame, two elongate jaws where each jaw has an inside curvature that matches a curvature of an outer surface of a pipe section, and an elastomeric liner on an inside surface of each jaw. Each jaw has a length and a height. The length of each jaw is substantially greater than the height. Each jaw is removably mounted to the frame along a proximal long edge of the jaw by a piano hinge that extends substantially from an entire length of the jaw. The jaws are movable between an open position in which the distal long edges of the jaws are spaced apart sufficiently so as to receive a pipe segment, and a closed position in which the distal long edges are pivoted toward each other sufficiently so as to grip the pipe along substantially the entire length of the jaws.

U.S. Pat. No. 5,795,101, issued on Aug. 18, 1998 to Bill, discloses a grasping apparatus for handling an elongated workpiece, such as a pipe section. The grasping apparatus is designed to be suspended from a lifting device. The grasping apparatus has a first frame, and a second frame displaceably secured to the first frame, a rotator adapted to angularly rotate the first frame about a normally vertical axis of rotation with respect to the first frame, grapplers connected to the second frame in opposing juxtaposition and are moveable between an open position and a closed position, a pitch actuator adapted to displace the second frame with respect to the first frame in an up or down pitching movement, and a linear displacement actuator adapted to displace the second frame with respect to the first frame. The pitch actuator moves the elongated workpiece in an up or down pitching movement. The linear displacement actuator displaces an elongated workpiece in a linear direction substantially along its centerline of a linear working axis. The linear working axis is substantially along the center line of the elongated workpiece when the workpiece is securely grasped by the grapplers.

U.S. Pat. No. 6,280,119, issued on Aug. 28, 1002 to Ryan et al., discloses a working implement for lifting and positioning successive sections of elongate workpieces, and for engaging respective ends of the sections of elongate workpieces. The implement has a mounting assembly that has an implement mounting interface adapted and configured to attach the implement to an end of a working arm of a working vehicle that has a cooperating machine mounting interface securely mounted to the working implement, a grip assembly for gripping elongate workpieces that are positioned and lifted by the working implement, an orienting apparatus that orients the grip assembly with respect to respective the Y and Z axes of the elongate workpiece, and a linear displacement apparatus that displaces the grip assembly.

U.S. Pat. No. 4,362,435, issued on Dec. 7, 1982 to Henry, discloses an apparatus for laying pipe in a trench and joining successive sections of pipe. The apparatus has an elongated carriage that is of a length sufficient to straddle the trench, and crane mounted to the carriage. The carriage has a propelling mechanism that engages the surface of the trench and moves the carriage therealong. The propelling mechanism is steerably driven. The crane has an articulating arm that is of adjustable length. The arm has an outer end portion that is controllably movable both laterally with respect to the trench and between respective positions above and within the trench. The crane is tiltably mounted to the carriage.

It is an object of the present invention to provide a vehicle to install pipe underground.

It is another object of the present invention to provide a vehicle that controls position of pipe while maneuvering the pipe from above ground to below ground.

It is another object of the present invention to provide a vehicle to stabilize pipe while maneuvering the pipe from above ground to below ground.

It is another object of the present invention to provide a vehicle to position a pipe section in any direction necessary to make a tie-end line up and/or to lower the pipe in a ditch.

It is another object of the present invention to provide a vehicle to position a pipe section in a direction necessary to load pipe onto trucks.

It is still another object of the present invention to stabilize any size, diameter, and material of pipe.

These and other objects and advantages of the present invention will become apparent from a reading of the attached specification and appended claims.

SUMMARY OF THE INVENTION

The present invention is a heavy equipment vehicle for laying pipe, such as a modified excavator. The vehicle includes an undercarriage with a means for moving, an excavator cab mounted to the undercarriage by a rotating platform, a counterweight mounted to the cab, a boom having a first arm and a second arm, first and second pipe hoists means, and an excavator tool attachment. The counterweight mounted on the body is extendable and retractable so as to reduce risk of tipping of the excavator cab. The first arm of the boom has a plurality of ram cylinders pivotally attached to the front of the excavator cab for raising and lowering the boom. The excavator tool attachment can be a bucket, scoop, grapple, a pulverizer, claw or a hammer of an excavator. Each arm of the vehicle has a pipe hoist means attached to an underside thereof. Each pipe hoist means is a two-block hoist with a top block and a bottom block with a hook extending downward, and a winch with line connecting to the two-block hoist, such that the line lowers and raises a hook connected to a harness of a pipe. One of the pipe hoist means has a rack and pinion attachment to the underside of the firm arm of the boom.

The boom can also have stabilizer attachments. A first stabilizer is positioned on a side of the second arm and extended outward toward the second pipe hoist means and the pipe; and a second stabilizer is positioned on an opposite side of the second arm and extending outward toward the second pipe hoist means and the pipe. The stabilizers are hydraulically extendable and positioned on opposite sides of the second pipe hoist means so as to contact the pipe for balancing. Each stabilizer has a cylinder and a piston, movable within an interior of the cylinder. The piston has a foot formed on an end thereof with a shape to grasp an outer surface of a pipe.

DETAILED DESCRIPTION OF THE DRAWINGS

Figure 1:
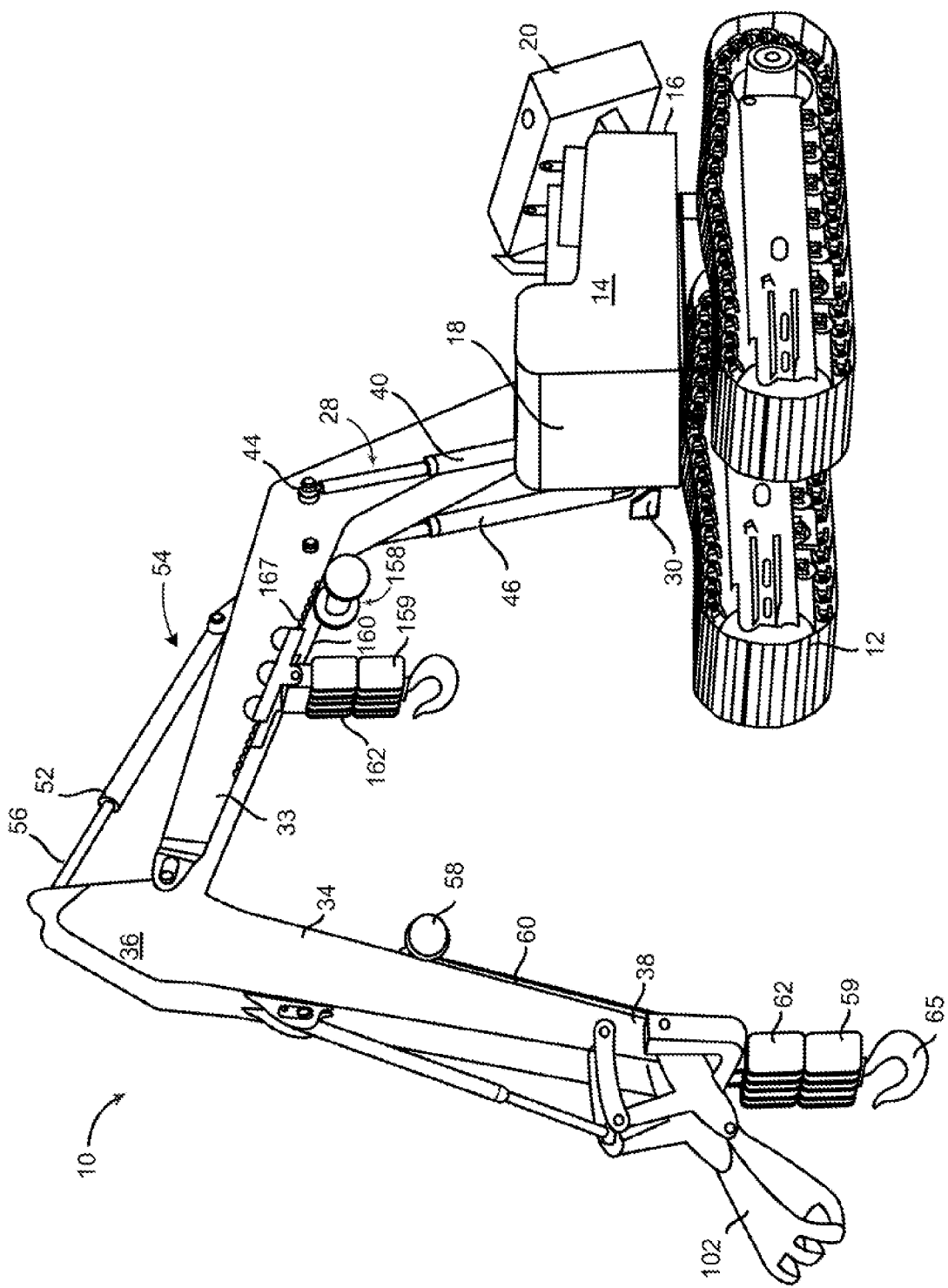
FIG. 1 shows a perspective view of the vehicle of the present invention for laying pipe.
Figure 2:
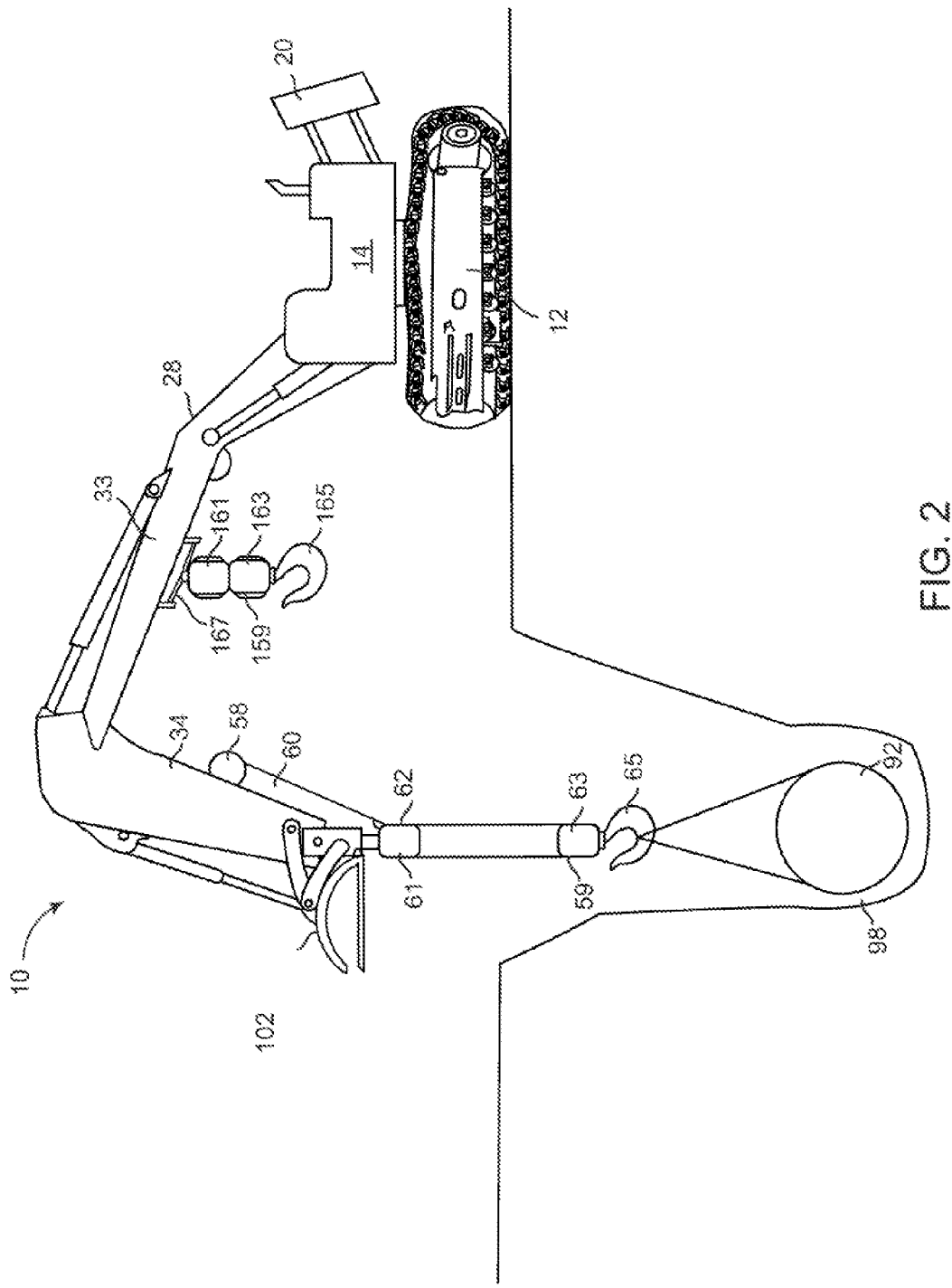
FIG. 2 shows an elevational view of the vehicle of the present invention, showing a placement of pipe in a trench.

Referring to FIGS. 1 and 2, there is shown a perspective view of the heavy equipment vehicle 10 in the preferred embodiment of the present invention. The vehicle 10 has an undercarriage 12 with means for moving 12. The means for moving the undercarriage 12 is comprised of track structures or wheels as an excavator. An excavator cab 14 has a front 18 and a back 16 and is rotatably mounted to a top of the undercarriage 12 by a rotating platform. The cab 14 has a front 18 and a back 16. The counterweight 20 is mounted to the back 16 of the cab 14. A boom 28 is pivotally mounted to the front 18 of the cab 14 with a first arm 33 and a second arm 34, where the end 30 of the first arm 33 of the boom 28 is pivotally mounted to the front 18 of the body 14. The second arm 34 is pivotally mounted to the first arm 33. More particularly, end 36 of the second arm 34 is pivotally mounted to the end 32 of the boom 28. The vehicle 10, possibly a modified excavator, also includes a pivoting excavator tool attachment 102, which can be a bucket, scoop, grapple, a pulverizer, claw or a hammer.

A first ram cylinder 40 and a second ram cylinder 46 pivot the boom 28 relative to the cab 14. An end of the first ram cylinder 40 is connected to the front 18 of the cab 14. Opposite end 44 of the first ram cylinder 40 is connected to the boom 28. Similarly, an end of the second ram cylinder 46 is connected to the front 18 of the cab 14 and an opposite end 50 of the second ram cylinder 46 is connected to the boom 28. The first and second rams cylinders 40 and 46 extend and retract so as to raise and lower the boom 28. A third ram cylinder 52 pivots the second arm 34 with respect to first arm 33. End 54 of the third ram cylinder 52 is connected to the first arm 33. End 56 of the third ram cylinder 52 is connected to end 36 of the second arm 34. The cab 14 rotates relative to the undercarriage 12 so as to position a pipe section 92 that is held by the vehicle 10 of the present invention near a ditch 98. The first ram cylinder 40, second ram cylinder 46, and third ram cylinder 52 can be 350 series rams used on the vehicle 10. If larger rams are necessary to increase the lifting capacity of the pipe layer 10, 600 series rams can be used in placed of 350 series.

A first pipe hoist means 162 is connected on an underside of the first arm 33 and extends along a length of the first arm 33. There is a two-block hoist 159 with a top block 161 and a bottom block 163 with a hook 165 extending downward, as shown in FIG. 2. A winch 158 is placed on an underside of the first arm 34. A line 160 extends between the winch 158 and the two-block hoist 159. The winch 158 extends and retracts the line 160 so as to raise and lower the bottom block 163 of the two-block hoist 159. The hook 165 engages a pipe or pipe harness for lifting and placement. The top block 161 of the first pipe hoist means 162 has a rack and pinion attachment 167 to the underside of the first arm 33 so as to allow back and forth movement along the length of the first arm 33. A hook 64 is connected to the two-block hoist 62. The hook 64 is used to hold the pipe section over ditch 98.

The vehicle 10 also includes a second pipe hoist means 62, being connected at a distal end 38 of the second arm 34. There is a two-block hoist 59 with a top block 61 and a bottom block 63 with a hook 65 extending downward, as shown in FIG. 2. A winch 58 is placed on an underside of the second arm 34. A line 60 extends between the winch 58 and the two-block hoist 62. The winch 58 extends and retracts the line 60 so as to raise and lower the two-block hoist 62. The hook 65 is also used to engage a pipe or pipe harness, as shown in FIG. 2. The second pipe hoist means 58 is rotatably mounted at the distal end 38 of the second arm 34 separate from the excavator tool attachment 102.

Figure 3:
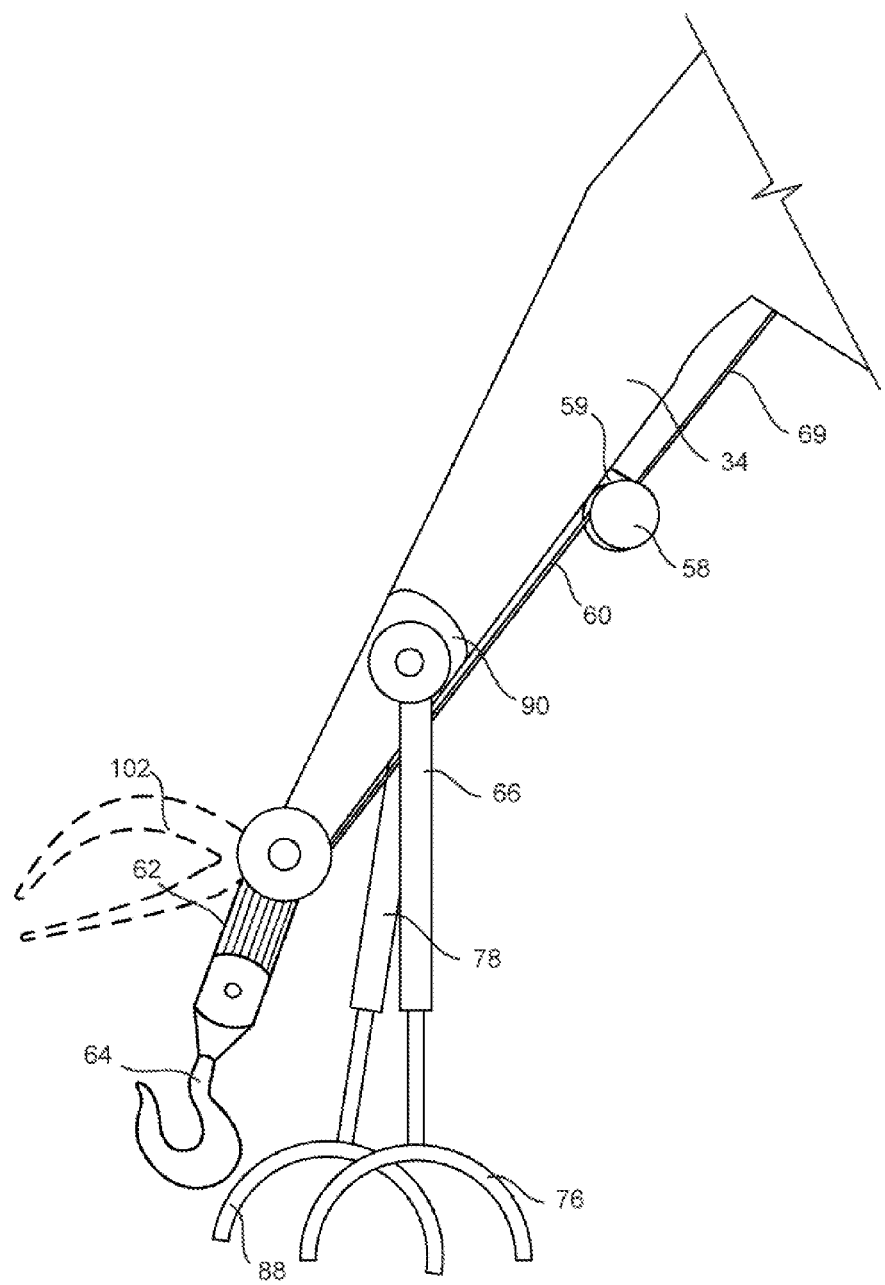
FIG. 3 shows a side elevational view of an arm of the vehicle with additional attachments for stabilizing the pipe.
Figure 5:
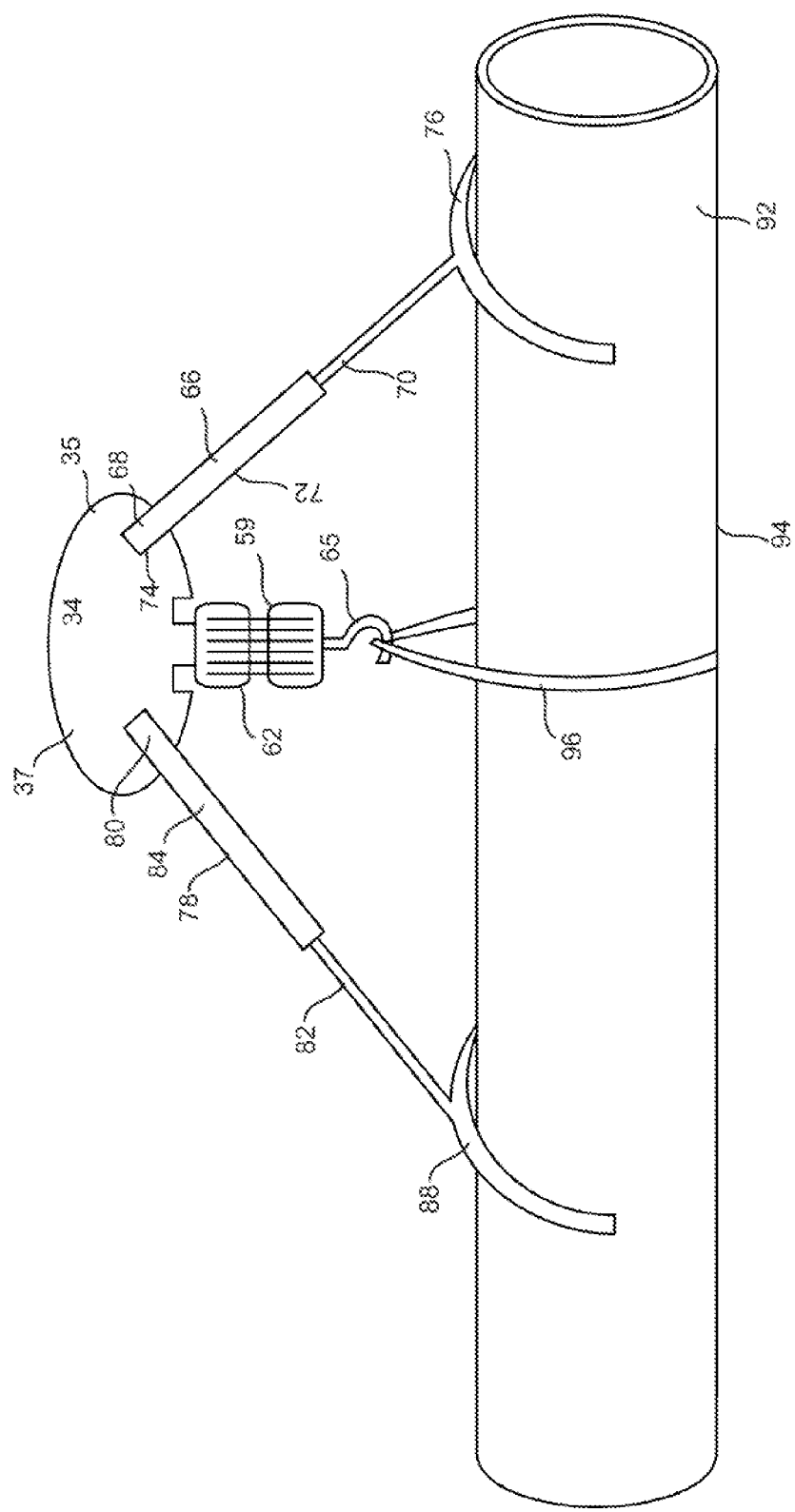
FIG. 5 is a side elevational view showing the extendable counterweight on the vehicle.

FIGS. 3 and 5 show another embodiment of the present invention with a first stabilizer 66 and a second stabilizer 78. The first stabilizer 66 is attached to a side 35 of the second arm 34 and extended outward toward the second pipe hoist means 58 and the pipe. The second stabilizer 78 is positioned on an opposite side 37 of the arm 34 and also extended outward toward the second pipe hoist means 58. The first and second stabilizers 66 and 78 can pivot relative to the sides 35 and 37 of the second arm 34 and are hydraulically extendable. The stabilizers 66 and 78 contact the pipe 92 for balancing as seen in FIG. 5. Each stabilizer has a cylinder and a piston, movable within an interior of the cylinder, the cylinder being attached to a respective side of the second arm, the piston having a foot formed on an end thereof, the foot being shaped so as to grasp an outer surface of a pipe. The first and second stabilizers 66 and 78 are movable in any direction so that they contact an outer surface of the pipe section 92 and stabilize the pipe section 92 from swinging about the hook 65.

The undercarriage 12 is a typical carriage found on an excavator, such as one having tracks, a track frame and a drive means for moving. The cab 14 is a body similar to that of an excavator with a rotating platform. The first and second pipe hoist means 59 and 159 have respective pulley-type systems that minimizes the force required to lift large pipe sections with the respective winches 58 and 158. The vehicle 10 of the present invention can maneuver so as to position a pipe section 92 that is located remotely of the ditch 98 to a location adjacent the ditch 98. Thus, the vehicle 10 can move a pipe section 92 both laterally (i.e. horizontally) and vertically. The stabilizers 66 and 78 ensure that the pipe section 92 does not swing undesirably on the hook 65. The stabilization of the pipe section 92 provides for a safer work environment for personnel installing the pipe section into the ditch 98. Counterweight 20 acts to offset the weight of the pipe section so that the apparatus 10 does not tip over. The counterweight 20 is adjustable.

Referring to FIG. 5, there is shown an isolated perspective view of a pipe section 92 held by the second arm 34 of the vehicle 10 of the present invention. Line 60 extends between winch 58 and the two-block hoist 59. The winch 58 tensions the line 60 so as to hold the two-block hoist 59 at a desired height above the ground. A strap 96 is placed around the pipe section 92. The strap 96 is held on hook 64. The stabilizers 66 and 78 contact the outer surface 94 of the pipe section 92. The first stabilizer 66 has an end 68 pivotally connected to the end 38 of the second arm 34. The first stabilizer 66 has a cylinder 72 and a piston 70. The piston 70 is extendable and retractable within the interior of the cylinder 72. Thus, the first stabilizer 66 can extend or retract according to the distance between end 38 of the second arm 34 and the outer surface 94 of the pipe section 92. A foot 76 is formed on the piston 70. The foot 76 is contoured so as to contact the outer surface 94 of the pipe section 92. The second stabilizer 78 has end 80 pivotally connected to the end 38 of the second arm 34.

The second stabilizer 78 also has a piston 82 and a cylinder 84. The end 86 of the cylinder is pivotally connected to the end 38 of the second arm 34. The piston 82 extends and retracts within the interior of the cylinder 84 so as to adequately contact the outer surface 92 of different sizes of pipe sections 92. A foot 88 is formed on the piston 82 so as to contact the outer surface 94 of the pipe section 92. The stabilizing arms 66 and 78 keep the pipe section 92 from swinging relative to the hook 64. An operator of the pipe layer 10 can pivot the stabilizing arms 66 and 78 so as to change the orientation of the pipe section 92. If the pipe section 92 is to be inclined, the piston 70 of the first stabilizing arm 66 can be retracted into the cylinder 72 while the piston 82 of the second stabilizing arm 78 can be extended from the cylinder 84. Likewise, if the pipe section 92 needs to be declined, the piston 82 of the second stabilizing arm 78 can be retracted into the cylinder 84 and the piston 70 of the first stabilizing arm 66 can be extended out of the interior of the cylinder 72. If the winch 58 extends line 60 so as to lower the two-block hoist 62 closer to the ground, the pistons 70 and 82 of the first and second stabilizing arms 66 and 78 can extend outwardly of the cylinders 72 and 84 so as to continuously contact the outer surface 94 of the pipe section 92.

Referring to FIG. 3, there is shown a side elevational view of the second arm 34 of the pipe layer vehicle 10 of the present invention. The winch 58 is hydraulically powered. Line 69 delivers pressurized hydraulic fluid to and from the winch 58. The cab 14 of the pipe layer vehicle 10 includes appropriate equipment for hydraulically powering the components of the pipe layer vehicle 10. The first and second stabilizers 66 and 78 can rotate between approximately 45° and 180°. The second arm 34 has a pivoting excavator tool attachment 102. The foot 76 of the first stabilizer 66 is adjustable so as to fit the outer surface of the pipe section. The foot 88 of the second stabilizing arm 78 is adjustable so as to fit the outer surface of the pipe section 92.

Figure 4:
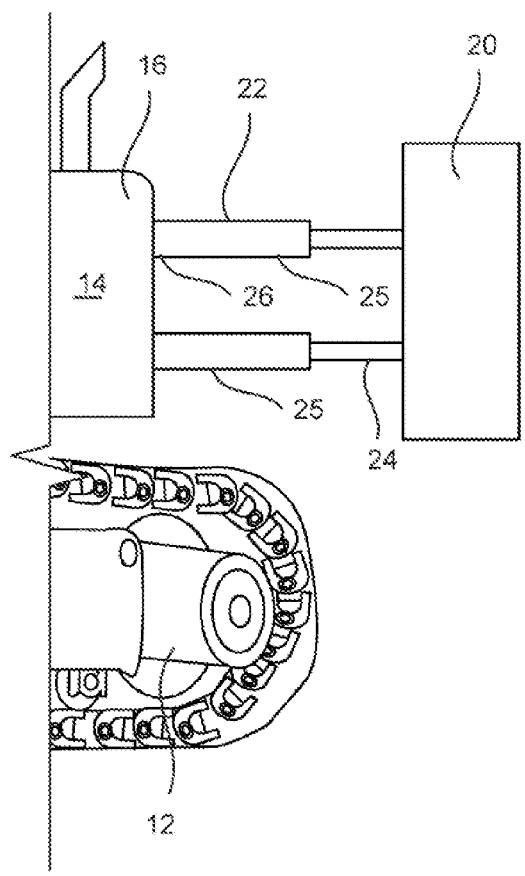
FIG. 4 shows an isolated perspective view of the stabilizing arms on the pipe.

Referring to FIG. 4, there is shown a side elevational view of the back 16 of the cab 14. The counterweight 20 is mounted to the back 16 of the cab 14. The cab 14 is rotatably mounted on the undercarriage 12. An extending means 22 connects the counterweight 20 with the cab 14. The extending means 22 extends and retracts the counterweight 20 for over-the-side lifting stability. The extending means 22 shown in FIG. 4 has piston-and-cylinder assemblies 25. Each assembly 25 has a piston 24 and a cylinder 26. The piston 24 extends and retracts within the interior of the cylinder. The extending means 22 moves the counterweight 20 relative to the body 14 so as to increase and decrease the leverage needed by the pipe layer 10.

As such, the present invention provides a vehicle to install pipe underground. The first and second stabilizing arms 66 and 78 can be positioned relative to the arm 34 in any direction necessary to make a tie-in line up, to the lower the pipe in the ditch 98, or to load pipes onto trucks or the like. The vehicle controls position of and stabilizes pipe while maneuvering the pipe from above ground to below ground. The pipe hoist means also allow the vehicle to position a pipe section in a direction necessary to load pipe onto trucks. The vehicle stabilizes any size, diameter, and material of pipe.

The foregoing disclosure and description of the invention is illustrative and explanatory thereof. Various changes in the details of the illustrated construction and method can be made without departing from the true spirit of the invention. The present invention should only be limited by the following claims and their legal equivalents.

I claim:

1. A heavy equipment vehicle for laying pipe comprising:
   an undercarriage with a means for moving;
   an excavator cab being rotatably mounted to a top of said undercarriage by a rotating platform, said excavator cab having a front and a back;
   a counterweight mounted to said back of said excavator cab;
   a boom having a first arm and a second arm, said boom having one end of said first arm pivotally mounted to said front of said excavator cab, said first arm and said second arm being pivotally connected to each other;
   a first pipe hoist means attached to an underside of said first arm, said first pipe hoist means extending along a length of said first arm, said first pipe hoist means comprising:
      a two-block hoist with a top block and a bottom block with a hook extending downward; and
      a winch with a line connected to said two-block hoist, said line lowering and raising said hook so as to engage a harness of the pipe;
   a second pipe hoist means attached to an underside of said second arm, said second pipe hoist means extending to a distal end of said second arm; and
   an excavator tool attachment rotatably mounted to said distal end of said second arm.

2. The vehicle for laying pipe of claim 1, wherein said top block of said first pipe hoist means has a rack-and-pinion attachment to said underside of said first arm so as to allow back-and-forth movement along said length of said first arm.

3. The vehicle for laying pipe of claim 1, said second pipe hoist means comprising:
   a two-block hoist with a top block and a bottom block with a hook extending downward; and
   a winch with a line connected to said two-block hoist, said line lowering and raising said hook so at to engage a harness of the pipe.

4. The vehicle for laying pipe of claim 3, wherein said top block of said second pipe hoist means is rotatably mounted at said distal end of said second arm separate from said excavator tool attachment.

5. The vehicle for laying pipe of claim 1, wherein said excavator tool attachment is one of a bucket, a scoop, a grapple, a pulverizer, a claw and a hammer.

6. The vehicle for laying pipe of claim 1, said means for moving said undercarriage being tracks cooperative with said excavator cab.

7. The vehicle for laying pipe of claim 1, said means for moving said undercarriage being wheels cooperative with said excavator cab.

8. The vehicle for laying pipe of claim 1, further comprising:
   a first stabilizer positioned on a side of said second arm and extending outwardly toward said second pipe hoist means and the pipe; and
   a second stabilizer positioned on an opposite side of said second arm and extending outwardly toward said second pipe hoist means and the pipe.

9. The vehicle for laying pipe of claim 8, said first stabilizer and said second stabilizer being positioned on opposite sides of said second pipe hoist means so as to contact the pipe for balancing.

10. The vehicle for laying pipe of claim 8, said first stabilizer and said second stabilizer being hydraulically extendable.

11. The vehicle for laying pipe of claim 8, each of said first and second stabilizers having a cylinder and a piston, said piston being movable within an interior of the cylinder, said cylinder being attached to a respective side of said second arm, said piston having a foot formed on an end thereof, said foot being shaped so as to grasp an outer surface of a pipe.

12. The vehicle for laying pipe of claim 1, wherein said first arm of said boom has a plurality of ram cylinders pivotally attached to said front of said excavator cab, said ram cylinders being hydraulically actuated and mounted on opposite sides of said first arm.

13. The vehicle for laying pipe of claim 1, wherein said counterweight mounted on the body is extendable and retractable.

14. An excavator comprising:
   an undercarriage with tracks, a track frame and a drive means for moving;
   an excavator house being rotatably mounted to a top of said undercarriage by a rotating platform, said excavator house having a front and back;
   a counterweight mounted to said back of said excavator house;
   a boom being comprised of a first arm and a second arm, said boom having one end of said first arm pivotally mounted to said front of said excavator house, said first and second arms being pivotally connected to each other;
   a pipe hoist means attached to said boom; and
   an excavator tool attachment rotatably mounted to said distal end of said second arm, said pipe hoist means comprising:
      a first pipe hoist means attached to an underside of said first arm, said first pipe hoist means extending along a length of said first arm, said first pipe hoist means comprising:
         a two-block hoist with a top block and a bottom block with a hook extending downward; and
         a winch with a line connecting to said two-block hoist, said line lowering and raising said hook so as to engage a harness of the pipe.

15. The excavator of claim 14, further comprising:
   a second pipe hoist means attached to an underside of said second arm, said second pipe hoist means extending to a distal end of said second arm, said second pipe hoist means comprising:
      a two-block hoist with a top block and a bottom block with a hook extending downwardly; and
      a winch with a line connecting to said two-block hoist, said line lowering and raising said hook so at to engage a harness of the pipe.

16. The excavator of claim 14, wherein said top block of said first pipe hoist means has a rack-and-pinion attachment to said underside of said first arm so as to allow back-and-forth movement along said length of said first arm.

17. The excavator of claim 14, wherein said excavator tool attachment is one of a bucket, a scoop, a grapple, a pulverizer, a claw and a hammer.

18. The excavator of claim 14, further comprising:
   a first stabilizer positioned on a side of said second arm and extended outward toward said second pipe hoist means and the pipe; and
   a second stabilizer positioned on an opposite side of said second arm.

* * * * *